United States Patent
Lin

(10) Patent No.: US 11,790,509 B2
(45) Date of Patent: Oct. 17, 2023

(54) METHOD OF BUILDING MODEL OF DEFECT INSPECTION FOR LED DISPLAY

(71) Applicant: MACROBLOCK, INC., Hsinchu (TW)

(72) Inventor: Yi-Sheng Lin, Hsinchu (TW)

(73) Assignee: MACROBLOCK, INC., Hsinchu (TW)

( * ) Notice: Subject to any disclaimer, the term of this patent is extended or adjusted under 35 U.S.C. 154(b) by 435 days.

(21) Appl. No.: 17/248,533

(22) Filed: Jan. 28, 2021

(65) Prior Publication Data

US 2021/0256685 A1     Aug. 19, 2021

(30) Foreign Application Priority Data

Feb. 14, 2020   (TW) .................................. 109104732

(51) Int. Cl.
  *G06T 7/00*   (2017.01)
  *G06N 20/00*   (2019.01)

(52) U.S. Cl.
  CPC ........... *G06T 7/0004* (2013.01); *G06N 20/00* (2019.01); *G06T 2207/20081* (2013.01); *G06T 2207/30121* (2013.01)

(58) Field of Classification Search
  None
  See application file for complete search history.

(56) References Cited

U.S. PATENT DOCUMENTS

| | | | |
|---|---|---|---|
| 10,085,333 B1* | 9/2018 | Huang | H05B 45/54 |
| 10,117,304 B2* | 10/2018 | Huang | H05B 45/58 |
| 10,753,882 B1* | 8/2020 | Mahajan | H04N 7/18 |
| 2012/0249779 A1* | 10/2012 | Ji | G01N 21/8806 |
| | | | 348/131 |
| 2018/0268255 A1* | 9/2018 | Surazhsky | G06N 3/045 |
| 2019/0137884 A1* | 5/2019 | Jung | G06T 7/0004 |
| 2019/0191150 A1* | 6/2019 | Zhang | H04N 17/04 |
| 2019/0258890 A1* | 8/2019 | Lee | G06V 10/25 |
| 2020/0018957 A1* | 1/2020 | Uemura | G02B 27/017 |
| 2020/0082297 A1* | 3/2020 | Watanabe | G06N 5/04 |

(Continued)

FOREIGN PATENT DOCUMENTS

TW     201243317     11/2012

OTHER PUBLICATIONS

Park, Yunwon, Ambiguous Surface Defect Image Classification of AMOLED Displays in Smartphones, Apr. 2016, IEEE Transactions on Industrial Informatics, pp. 597-607 (Year: 2016).*

(Continued)

*Primary Examiner* — Lewis G West
(74) *Attorney, Agent, or Firm* — Akerman LLP; Peter A. Chiabotti

(57) ABSTRACT

A method of building a model of defect inspection for a light-emitting diode (LED) display is adapted to be implemented by a model-building system. The model-building system stores captured images respectively of LED displays that were displaying images. Each of the captured images corresponds to a status tag that indicates a status of the image being displayed by the respective one of the LED displays. The method includes: performing data preprocessing on the captured images to result in pieces of pre-processed data that respectively correspond to the captured images; and building a model of defect inspection by using an algorithm of machine learning based on the pieces of pre-processed data and the status tags.

6 Claims, 5 Drawing Sheets

(56) References Cited

U.S. PATENT DOCUMENTS

| | | | |
|---|---|---|---|
| 2021/0027457 A1* | 1/2021 | Nakajima | G06F 30/3308 |
| 2021/0081509 A1* | 3/2021 | Salik | G06F 30/27 |
| 2021/0287353 A1* | 9/2021 | Soltwedel | B41F 33/02 |
| 2022/0036302 A1* | 2/2022 | Cella | G06Q 10/0834 |
| 2022/0130145 A1* | 4/2022 | Connary | G06V 20/10 |
| 2022/0328186 A1* | 10/2022 | Jeong | G16H 50/20 |
| 2022/0374720 A1* | 11/2022 | Qu | G06F 18/214 |
| 2022/0383783 A1* | 12/2022 | Yamazaki | G09G 3/3233 |
| 2023/0133152 A1* | 5/2023 | Barnehama | G06K 7/10722 |
| | | | 382/141 |

OTHER PUBLICATIONS

Zhu, Haidi et al., Deep-Learning-Enabled Automatic Optical Inspection for Module-Level Defects in LCD, Jan. 15, 2022, IEEE Internet of Things Journal, pp. 1122-1135 (Year: 2022).*

Taiwan Intellectual Property Office, "Search Report appended to an Office Action," along with English translation thereof, issued to Taiwanese patent application No. 109104732, dated Oct. 29, 2020, document of 2 pages.

* cited by examiner

US 11,790,509 B2

METHOD OF BUILDING MODEL OF DEFECT INSPECTION FOR LED DISPLAY

CROSS-REFERENCE TO RELATED APPLICATION

This application claims priority of Taiwanese Invention Patent Application No. 109104732, filed on Feb. 14, 2020.

FIELD

The disclosure relates to a method of building a model of defect inspection, and more particularly to a method of building a model of defect inspection for a light-emitting diode (LED) display.

BACKGROUND

Seven abnormal conditions commonly exist in light-emitting diode (LED) displays include gradient dim line, ghosting effect, non-uniform grayscale level at low grayscale, color shift at low grayscale, LED dead pixel, dim line at first scan line, and high contrast interference. Conventionally, visual inspection is adopted to check whether any one of the seven abnormal conditions is present. However, such approach is labor-intensive and time-consuming.

SUMMARY

Therefore, an object of the disclosure is to provide a method of building a model of defect inspection for a light-emitting diode (LED) display that can alleviate at least one of the drawbacks of the prior art.

According to the disclosure, the method is to be implemented by a model-building system. The model-building system stores a plurality of captured images respectively of a plurality of LED displays that were displaying images. Each of the captured images corresponds to a status tag indicating a status of the image that was being displayed by the respective one of the LED displays. The method includes steps of:
  A) performing data preprocessing on the captured images to result in plural pieces of pre-processed data that respectively correspond to the captured images; and
  B) building a model of defect inspection for an LED display by using an algorithm of machine learning based on the plural pieces of pre-processed data and the status tags that respectively correspond to the pieces of pre-processed data.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
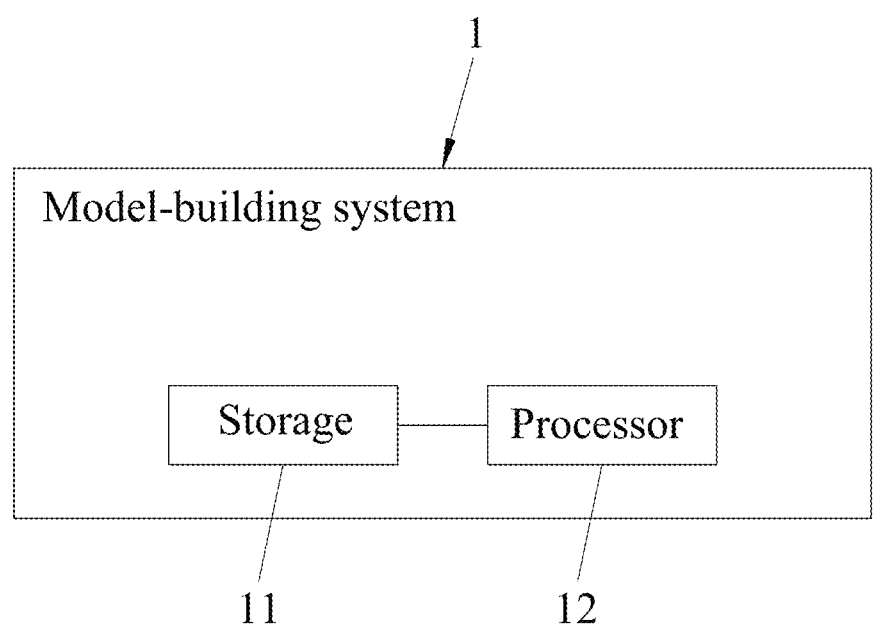
FIG. 1 is a block diagram illustrating an embodiment of a model-building system according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

FIG. 1 illustrates an embodiment of a model-building system 1 that is utilized to implement a method of building a model of defect inspection for a light-emitting diode (LED) display according to the disclosure. The model-building system 1 includes a storage 11, and a processor 12 that is electrically connected to the storage 11.

The storage 11 may be implemented by flash memory, a hard disk drive (HDD) or a solid state disk (SSD), electrically-erasable programmable read-only memory (EEPROM) or any other non-volatile memory devices, but is not limited thereto.

The processor 12 may be implemented by a central processing unit (CPU), a microprocessor, a micro control unit (MCU), a system on a chip (SoC), or any circuit configurable/programmable in a software manner and/or hardware manner to implement functionalities discussed in this disclosure.

The storage 11 of the model-building system 1 stores a plurality of captured images respectively of a plurality of LED displays that were displaying images. Each of the captured images corresponds to a status tag indicating a status of the image that was displayed by the respective one of the LED displays. Specifically speaking, for each of the LED displays, the respective captured image was obtained by a user controlling the LED display to display an image of a test pattern, determining a status of the image that was being displayed by the LED display, and using a camera to capture the image displayed by the LED display to result in the respective captured image, and then the user would tag the respective captured image with a status tag to indicate the status of the image thus determined.

In this embodiment, for each of the captured images, the status of the displayed image indicated by the status tag includes one of a normal condition and an abnormal condition, while the abnormal condition includes one of gradient dim line, ghosting effect, non-uniform grayscale level at low grayscale, color shift at low grayscale, LED dead pixel, dim line at first scan line, and high contrast interference.

For each of the seven types of abnormalities (i.e., gradient dim line, ghosting effect, non-uniform grayscale level at low grayscale, color shift at low grayscale, LED dead pixel, dim line at first scan line and high contrast interference) of the abnormal condition, a model of defect inspection is built to distinguish between the normal condition and the specific type of abnormality of the abnormal condition. For example, in a scenario where the type of abnormality of the abnormal condition is ghosting effect, a model of defect inspection is built to distinguish between the normal condition and the ghosting effect. That is to say, in order to determine whether any one of the seven types of abnormalities of the abnormal condition is present, seven models of defect inspection are built, respectively.

Figure 2:
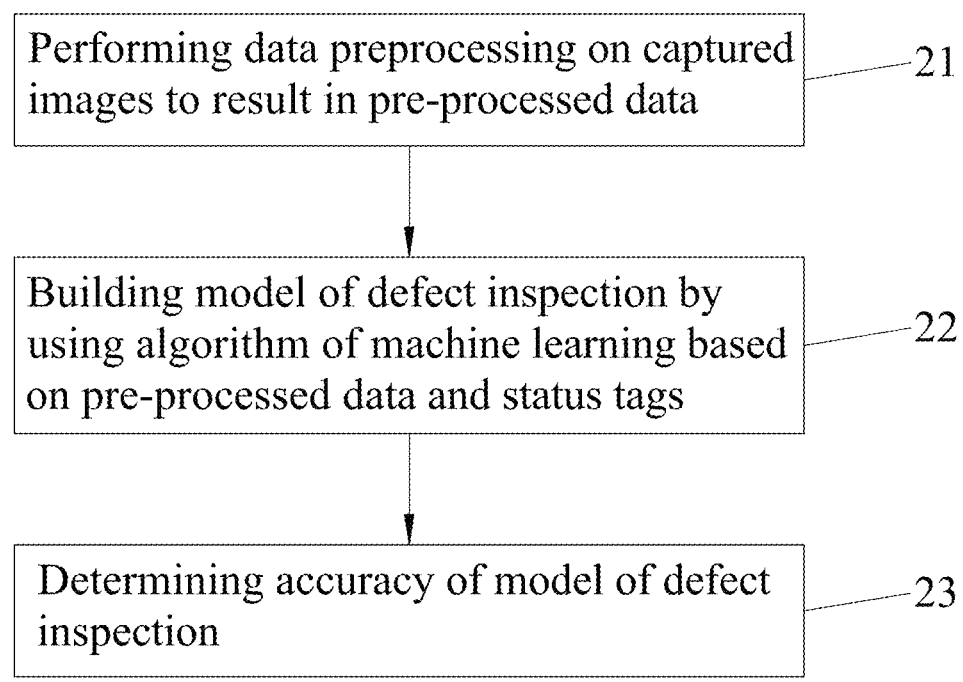
FIG. 2 is a flow chart illustrating an embodiment of a method of building a model of defect inspection for a light-emitting diode (LED) display according to the disclosure.

Referring to FIG. 2, an embodiment of the method of building a model of defect inspection for an LED display according to the disclosure is illustrated. For a specific type of abnormality of the abnormal condition, the method includes steps 21 to 23 delineated below, where each of the captured images used in the process of building the model corresponds to either the status tag that indicates the normal condition or the status tag that indicates the specific type of abnormality of the abnormal condition. In other words, the model built will be a model of defect inspection with respect to the specific type of abnormality for an LED display.

In step 21, the processor 12 performs data preprocessing on the captured images to result in plural pieces of pre-processed data that respectively correspond to the captured images.

Figure 3:
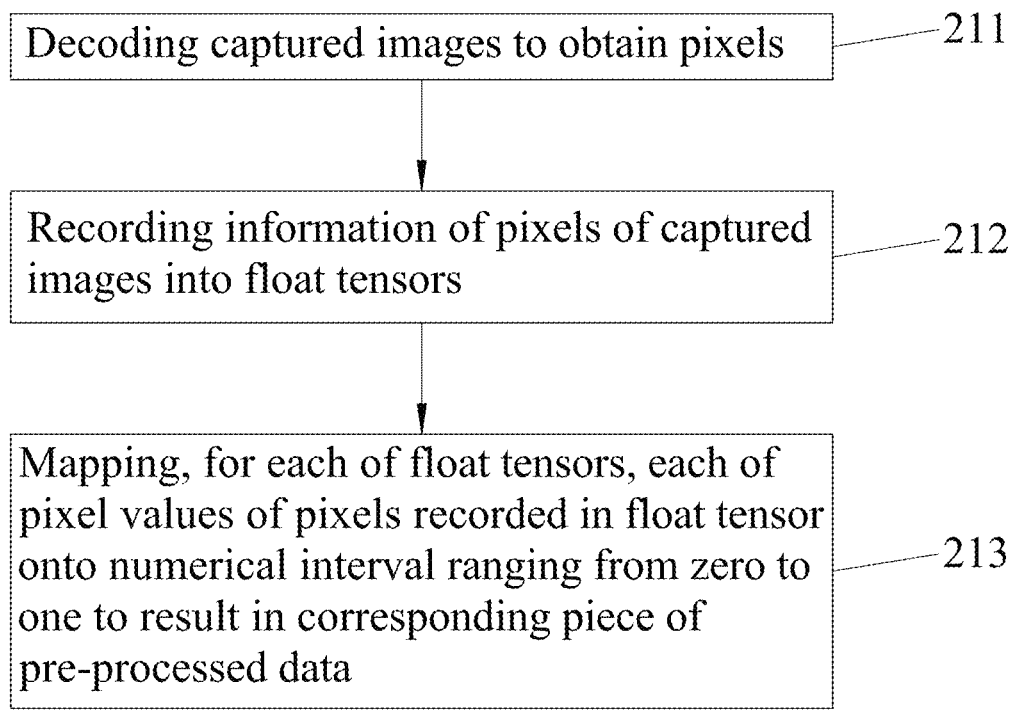
FIG. 3 is a flow chart illustrating an embodiment of performing data preprocessing in the method according to the disclosure.

Specifically speaking, referring to FIG. 3, step 21 includes sub-steps 211 to 213 described as follows.

In sub-step 211, for each of the captured images, the processor 12 decodes the captured image to obtain a plurality of pixels. It is worth to note that in this embodiment, the pixels thus decoded are represented in an RGB color space, but representation of the pixels is not limited thereto in other embodiments.

In sub-step 212, for each of the captured images, the processor 12 records information of the pixels of the captured image in a respective float tensor in a floating-point data type.

In sub-step 213, for each of the float tensors that respectively correspond to the captured images, the processor 12 maps each of pixel values of the pixels recorded in the float tensor onto a numerical interval ranging from zero to one, and hence the float tensor is converted into a corresponding one of the plural pieces of pre-processed data. It is worth to note that in this embodiment, each of the pixel values is mapped from being in a numerical interval ranging from 0 to 255 to being in the numerical interval ranging from 0 to 1.

In step 22, the processor 12 builds a model of defect inspection for an LED display by using an algorithm of machine learning based on the plural pieces of pre-processed data and the status tags that respectively correspond to the pieces of pre-processed data. In this embodiment, the algorithm of machine learning is exemplarily a convolutional neural network (CNN). However, in other embodiments, the algorithm of machine learning may be one of a gradient boosting decision tree (GBDT), a light gradient boosting machine (LGBM), categorical boosting (Catboost), a random forest (RF), extreme gradient boosting (XGBoost), support vector classification (SVC), relevant vector classification (RVC) and the like.

Figure 4:
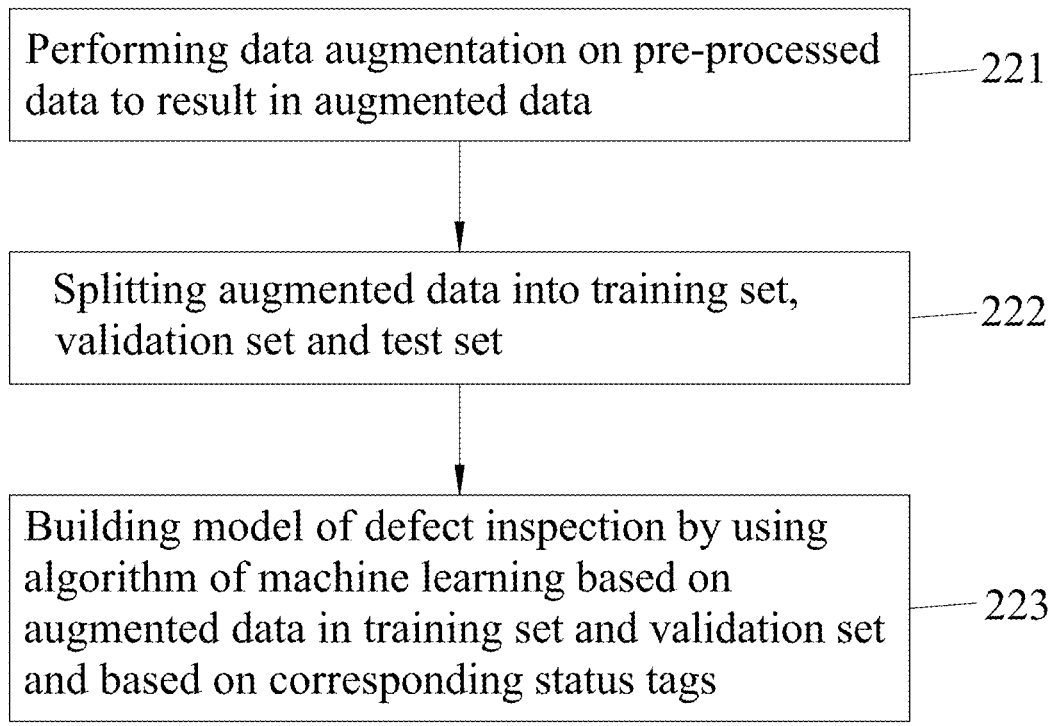
FIG. 4 is a flow chart illustrating an embodiment of building the model of defect inspection by using an algorithm of machine learning in the method according to the disclosure.

Specifically speaking, referring to FIG. 4, step 22 includes sub-steps 221 to 223 described as follows.

In sub-step 221, for each of the plural pieces of pre-processed data, the processor 12 performs data augmentation on the piece of pre-processed data so as to obtain plural pieces of augmented data which correspond to the status tag to which the piece of pre-processed data corresponds. As used herein, the (original) piece of pre-processed data is included among the plural pieces of augmented data which are obtained from data augmentation on the (original) piece of pre-processed data.

In sub-step 222, the processor 12 splits the plural pieces of augmented data obtained from the plural pieces of pre-processed data into a training set, a validation set and a test set.

In sub-step 223, the processor 12 builds the model of defect inspection by using the algorithm of machine learning based on those of the plural pieces of augmented data that are in the training set and the validation set and the status tags that correspond to the pieces of augmented data in the training set and the validation set.

Figure 5:
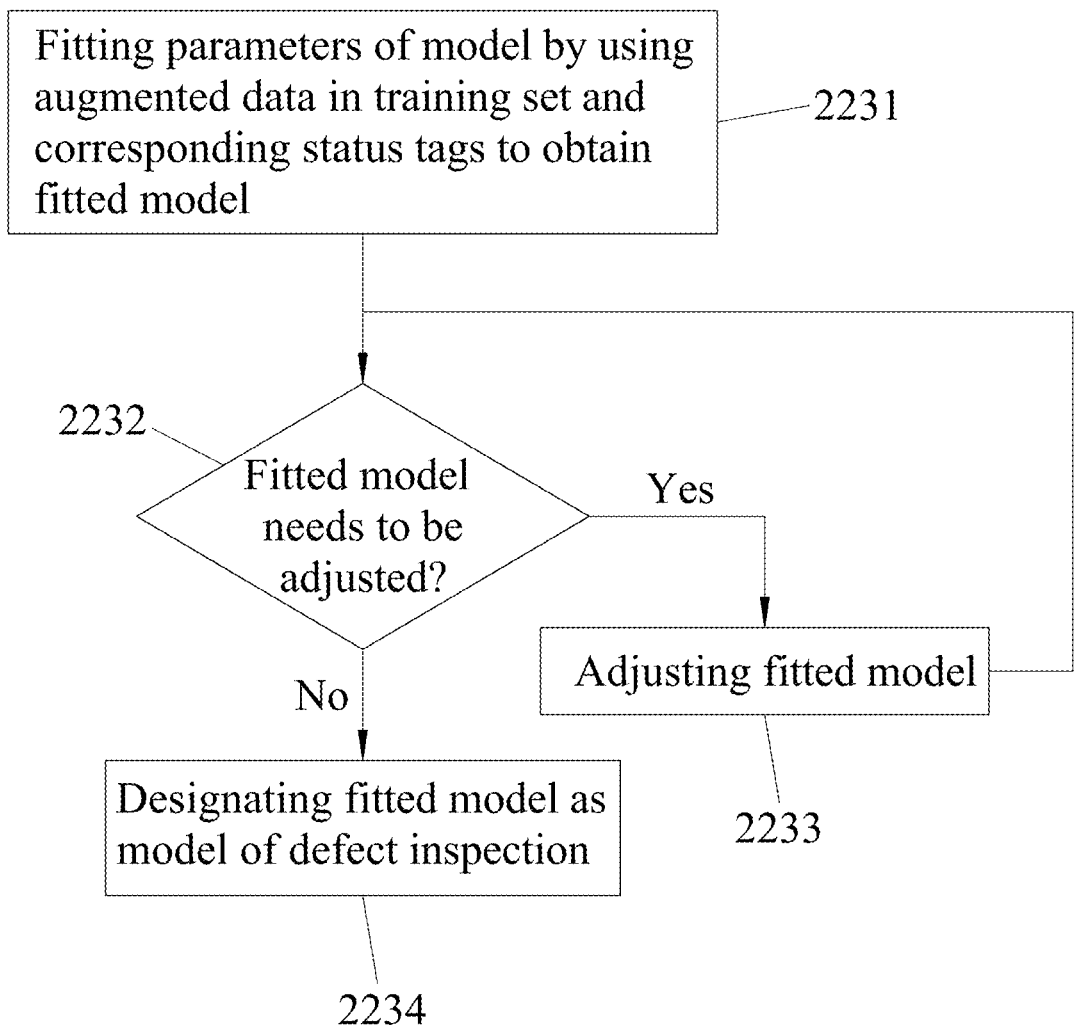
FIG. 5 is a flow chart illustrating an embodiment of training and validation during the process of building the model of defect inspection in the method according to the disclosure.

More specifically, referring to FIG. 5, sub-step 223 includes sub-steps 2231 to 2234 described as follows.

In sub-step 2231, the processor 12 fits parameters (e.g., weights of connections between neurons) of a model related to the algorithm of machine learning by using the pieces of augmented data in the training set and the status tags that correspond to the pieces of augmented data in the training set to obtain a fitted model.

Thereafter, the processor 12 builds the model of defect inspection based on the fitted model obtained in sub-step 2231, the pieces of augmented data in the training set and the validation set, and the status tags that correspond to the pieces of augmented data in the training set and the validation set.

In particular, in sub-step 2232, the processor 12 determines, based on the pieces of augmented data in the training set and the validation set and the status tags that correspond to the pieces of augmented data in the training set and the validation set, whether the fitted model needs to be adjusted. When it is determined that the fitted model needs to be adjusted, a flow of procedure of the method proceeds to sub-step 2233. On the other hand, when it is determined that the fitted model does not need to be adjusted, the flow proceeds to sub-step 2234.

In sub-step 2233, the processor 12 adjusts the fitted model, and then the flow returns to sub-step 2232. It is worth to note that in this embodiment, the processor 12 adjusts the fitted model by adjusting a set of hyperparameters that is related to the fitted model.

In sub-step 2234, the processor 12 designates the fitted model as the model of defect inspection with respect to the specific type of abnormality for an LED display.

It is worth to note that in this embodiment, the determination in sub-step 2232 as to whether the fitted model needs to be adjusted is made by determining whether overfitting or underfitting occurs in the fitted model. When it is determined that overfitting or underfitting occurs in the fitted model, the processor 12 determines that the fitted model needs to be adjusted. Otherwise, when it is determined that neither overfitting nor underfitting occurs in the fitted model, the processor 12 determines that the fitted model does not need to be adjusted.

In step 23, the processor 12 determines accuracy of the model of defect inspection for an LED display based on those of the plural pieces of augmented data that are in the test set and the status tags that correspond to the pieces of augmented data in the test set. In this embodiment, when the accuracy thus determined is lower than a preset accuracy threshold (e.g., 99%), new captured images with corresponding status tags (that indicate either the normal condition or the specific type of abnormality of the abnormal condition) will be provided to the model-building system 1 and be stored in the storage 11 thereof, and then steps 21 and 22 are repeated to rebuild the model of defect inspection based further on the new captured images and the corresponding status tags so as to improve the accuracy.

In use of the model of defect inspection with respect to the specific type of abnormality of an LED display, whether an image displayed by an LED display has the specific type of abnormality or not may be evaluated by inputting a captured image of the LED display that is displaying the image to the model of defect inspection to obtain a predicted result. The predicted result may be provided by the model outputting a status output that indicates the normal condition or the abnormal condition. In this case, since one model is built to inspect defects related to one specific type of abnormality and different models are built to inspect defects related to different types of abnormality, a status output that indicates the normal condition by one model means that the inputted captured image does not have the specific type of abnormality that the model was built to detect, and does not necessarily mean that presence of all seven types of abnormalities mentioned above are absent from the inputted capture image. In this way, visual inspection is only required on an LED display which has a predicted result indicating presence of the specific type of abnormality. In other applications, visual inspection can even be omitted.

To sum up, the method of building a model of defect inspection according to the disclosure utilizes the model-building system to perform data preprocessing on the captured images to result in the pieces of pre-processed data, and to build a model of defect inspection by using the algorithm of machine learning based on relevant pieces of pre-processed data and the status tags. Based on the model of defect inspection, automation of defect inspection for an LED display can be realized, and hence labor and time may be saved.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A method of building a model of defect inspection for a light-emitting diode (LED) display, the method to be implemented by a model-building system, the model-building system storing a plurality of captured images respectively of a plurality of LED displays that were displaying images, each of the captured images corresponding to a status tag indicating a status of the image that was being displayed by the respective one of the LED displays, said method comprising:

A) performing data preprocessing on the captured images to result in plural pieces of pre-processed data that respectively correspond to the captured images; and B) building a model of defect inspection for an LED display by using an algorithm of machine learning based on the plural pieces of pre-processed data and the status tags that respectively correspond to the pieces of pre-processed data, wherein step A) includes sub-steps of:

A-1) for each of the captured images, decoding the captured image to obtain a plurality of pixels;

A-2) for each of the captured images, recording information of the pixels of the captured image in a float tensor in a floating-point data type; and A-3) for each of the float tensors that respectively correspond to the captured images, mapping each of pixel values of the pixels recorded in the float tensor onto a numerical interval ranging from zero to one to thereby convert the float tensor into a corresponding one of the plural pieces of pre-processed data.

2. The method as claimed in claim 1, wherein, for each of the captured images, the status of the image indicated by the status tag includes one of a normal condition and an abnormal condition, the abnormal condition being one of gradient dim line, ghosting effect, non-uniform at low grayscale, color shift at low grayscale, LED dead pixel, dim line at first scan line, and high contrast interference.

3. The method as claimed in claim 1, wherein step B) includes sub-steps of:

B-1) for each of the plural pieces of pre-processed data, performing data augmentation on the piece of pre-processed data so as to obtain plural pieces of augmented data which correspond to the status tag to which the piece of pre-processed data corresponds and which include the piece of pre-processed data;

B-2) splitting the plural pieces of augmented data obtained from the plural pieces of pre-processed data into a training set, a validation set and a test set; and B-3) building the model of defect inspection by using the algorithm of machine learning based on those of the plural pieces of augmented data that are in the training set and the validation set and the status tags that correspond to those of the plural pieces of augmented data that are in the training set and the validation set.

4. The method as claimed in claim 3, wherein sub-step B-3) includes sub-steps of:

B-3-1) fitting parameters of a model related to the algorithm of machine learning by using those of the plural pieces of augmented data that are in the training set and the status tags that correspond to those of the plural pieces of augmented data that are in the training set to obtain a fitted model; and B-3-2) building the model of defect inspection based on the fitted model, those of the plural pieces of augmented data that are in the training set and the validation set, and the status tags that correspond to those of the plural pieces of augmented data that are in the training set and the validation set.

5. The method as claimed in claim 4, wherein sub-step B-3-2) includes sub-steps of:

B-3-2-1) based on those of the plural pieces of augmented data that are in the training set and the validation set and the status tags that correspond to those of the plural pieces of augmented data that are in the training set and the validation set, determining whether the fitted model needs to be adjusted;

B-3-2-2) adjusting the fitted model when it is determined that the fitted model needs to be adjusted; and B-3-2-3) when it is determined that the fitted model does not need to be adjusted, designating the fitted model as the model of defect inspection for an LED display.

6. The method as claimed in claim 3, subsequent to step B), further comprising:

C) based on those of the plural pieces of augmented images that are in the test set and the status tags that correspond to those of the plural pieces of augmented images that are in the test set, determining accuracy of the model of defect inspection for an LED display.

\* \* \* \* \*